Nov. 30, 1971    G. A. KENDALL    3,623,202
METHOD OF MAKING A DRIVE TRANSMITTING CONNECTION
Original Filed Nov. 27, 1968
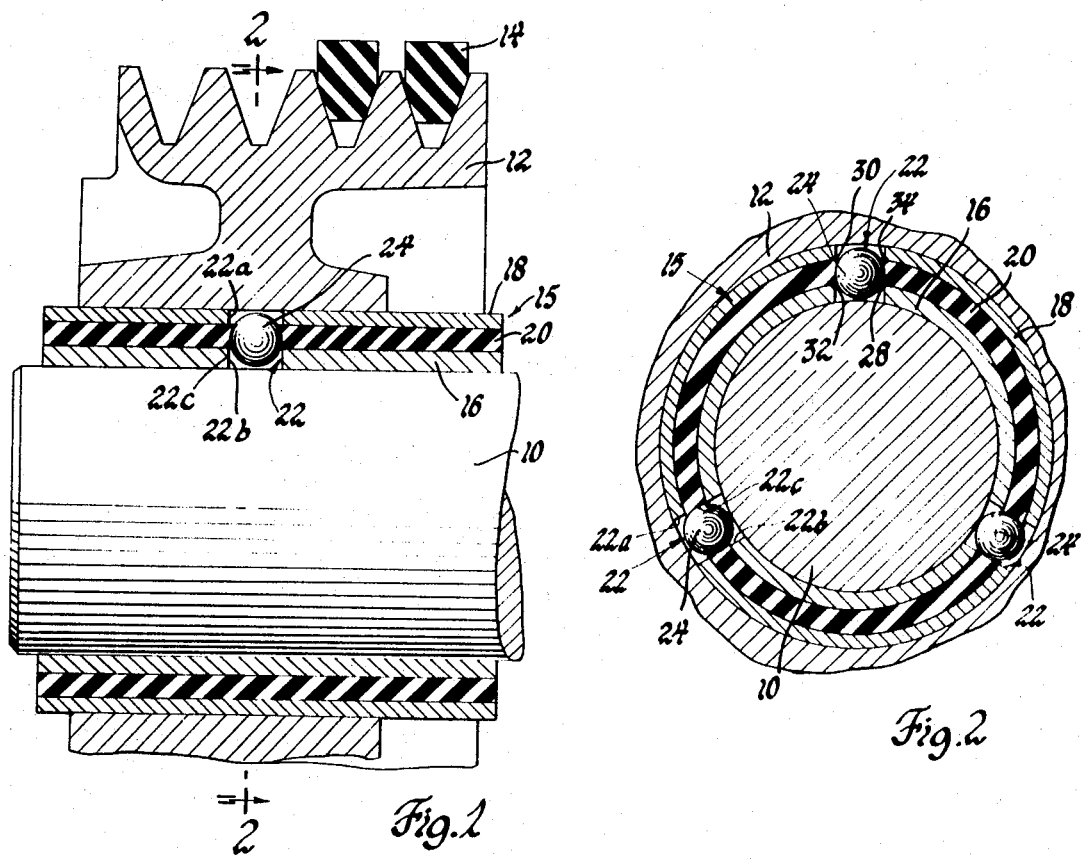
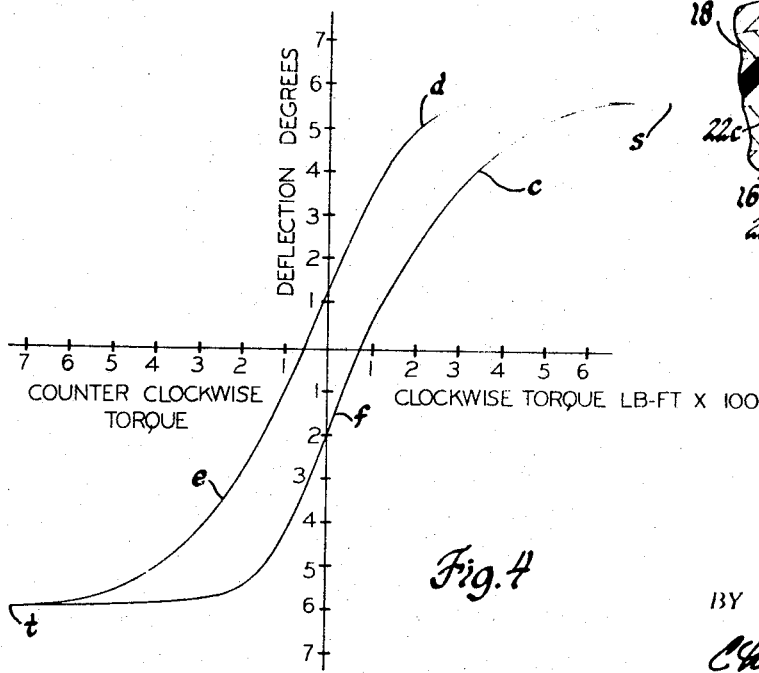
INVENTOR
Glen A. Kendall
BY
Charles R. White
ATTORNEY

United States Patent Office 3,623,202
Patented Nov. 30, 1971

3,623,202
METHOD OF MAKING A DRIVE TRANSMITTING CONNECTION
Glen Allen Kendall, Dearborn, Mich., assignor to General Motors Corporation, Detroit, Mich.
Original application Nov. 27, 1968, Ser. No. 779,479, now Patent No. 3,541,810, dated Nov. 24, 1970. Divided and this application Feb. 20, 1970, Ser. No. 12,945
Int. Cl. B23p *11/00, 19/00;* F16d *3/58, 7/00*
U.S. Cl. 29—148.4 A 4 Claims

ABSTRACT OF THE DISCLOSURE

There is a drive connection disposed between a rotatable input and a member driven by the input, which includes inner and outer cylindrical sleeves having a compressed elastomeric, torque-transmitting sleeve therebetween. The sleeves have aligned radial holes formed therein to accommodate steel balls which are effective on torque overload to provide driving contact between the inner and outer sleeves thereby limiting elastomeric sleeve slip and wear.

---

This application is a division of our copending application Ser. No. 779,479 for "Drive Transmitting Connection," filed Nov. 27, 1968, now Pat. No. 3,541,810.

This invention relates to drive transmitting connections and more particularly to a method of making a torque-transmitting coupling with an elastomeric torque transmitting device drivingly connecting torque-imparting and torque-receiving members and with rigid torque-transmitting construction, operable in response to overload of the elastomeric device, to transmit torque from one member to the other.

Elastomeric isolators are frequently utilized in the mechanical power transmission field to operatively connect drive and driven members to smooth out the flow of power therebetween. For example, such a yieldable torque-transmitting connection may be used between the crankshaft of an internal combustion engine and a belt-drive pulley which drives a fan or other accessory to effectively smother out engine-excited torsional vibrations to provide for smoother operation of the driven accessory.

These elastomeric devices have proven to be highly effective and efficient in such drives; however, in some cases the elastomeric device will slip when excessive torque is applied between the drive and driven member. Such slippage causes the elastomeric device to wear, thus impairing its efficiency and service life.

In this invention the slippage of the elastomeric device is substantially eliminated by the provision of improved overload stops which rigidly connect the drive and driven member when an overload condition occurs. In a preferred form of the invention steel balls are utilized between inner and outer metal sleeves to provide a metal-to-metal solid drive to prevent slippage of an elastomeric torque-transmitting sleeve compressed between the inner and outer sleeves when the sleeve is overloaded or subjected to excessive shear stresses. The balls and metal sleeves are hardened with the balls having a greater hardness than the sleeves. In the preferred form of the invention an annular opening in the sleeve assembly for accommodating each ball is readily made by a single drilling operation. This drilling operation produces radially aligned circular holes in the inner and outer sleeves having a diameter slightly larger than the diameter of the associated ball. Since the elastomeric member is under compression the size of the opening formed therein by the drilling operation is reduced when the drill bit is removed to a diameter slightly less than the diameter of the ball. Each ball is then inserted into a corresponding opening in the elastomeric sleeve with the elastic material yielding to securely hold the ball in an operating position out of contact with at least one metal sleeve, but so that it can increasingly resist relative sleeve movement by compression of the elastomeric sleeve. The ball can then make metal-to-metal contact with diagonally opposed edges of the holes in the inner and outer sleeves to limit such movement in response to overload of the elastomeric sleeve. The holes formed by the drilling operation eliminate the requirement for especially prepared drive contact surfaces such as ball ramps frequently found in prior devices. Sufficient clearance between the steel balls and the inner and outer sleeves is provided to permit the elastomeric sleeve to damp substantially all torsional vibrations in the drive line.

It is an object of this invention to provide an advanced torque-transmitting coupling utilizing an elastomeric vibration isolating and torque-transmitting device between drive and driven members and featuring a rigid drive member supported by the elastomeric device out of contact with the drive and driven members in normal torque transmission and drivingly engageable with the drive and driven members in response to torque overload of the isolator to transmit torque therebetween, thereby preventing the slip of the elastomeric device or the exceeding of the elastic limit thereof.

Another object of this invention is the provision of a yielding drive member between drive and driven members to smother torsional vibrations, which yielding is limited by a new and improved rigid ball-stop connection after predetermined shearing stresses have been imposed on the yielding member to prevent slippage or further deformation thereof.

Another object of the invention is to provide a drive coupling having inner and outer sleeves drivingly connected by an elastomeric member under compression between the sleeves and having circular radial holes formed therein for reception of spherical, rigid drive components normally held out of driving contact with the sleeves but which respond to relative rotation of the drive and driven members to make metal-to-metal contact with the inner and outer sleeves to limit further relative rotation and transmit the drive.

Another object of this invention is to provide a new and improved method for making a flexible torque-transmitting coupling utilizing a ball-stop in a hole drilled into torque-transmitting and torque-receiving structure.

These and other features and objects of the invention will become more apparent from the following detailed descriptions and drawings in which:

FIG. 1 is a side elevational view partly in cross section showing a drive coupling in accordance with this invention between an input and an output member.

FIG. 2 is a view taken along lines 2—2 of FIG. 1.

FIG. 3 is a view of a portion of FIG. 2, illustrating operation of the invention.

FIG. 4 is a hysteresis curve illustrating the vibrating damping characteristics and the operation of this invention.

As shown in FIG. 1, there is a shaft 10, which for the purposes of describing how this invention works, may be the crank shaft of an internal combustion engine such as that shown in the U.S. Pat. 3,400,695 issued Sept. 10, 1968 to K. Zaruba. This crank shaft drives a pulley 12, which in turn dirves a belt 14 that is operatively connected to drive a fan or other accessory, not shown. To transmit the drive from the shaft 10 to the pulley 12 in this invention there is a drive coupling identified generally at 15 which has a metallic inner cylindrical sleeve 16 and a metallic outer cylindrical sleeve 18, drivingly connected by an elastomeric sleeve 20 compressed between sleeves 16 and 18. The drive coupling 15 has a plurality of holes 22 therein, each formed by a single drilling operation. Each hole is defined by an annular opening 22a and 22b in the inner and outer metallic sleeves respectively and an annular opening 22c in the elastomeric sleeve. The openings 22a and 22b are slightly larger in diameter than the diameter of a hardened steel ball 24. Since the elastomeric sleeve is under compression, the diameter of opening 22c will be slightly less than the diameter of the ball 24 when the drill bit is removed. This construction facilitates the assembly of the ball into openings 22 and provides for the retention of the ball in the operating position by the elastomeric sleeve. As shown best in FIGS. 1 and 2 the elastomeric sleeve tightly grips the ball 24 so that it can be positioned at a station whereby the ball center is aligned with an axis intermediate the internal and external diameter of the elastomeric sleeve.

Since the diameter of the holes in the metallic sleeves is greater than that of ball 24, the ball is supported by the sleeve 20 out of contact with the metallic sleeves. The ball has a diameter larger than the difference between the outer diameter of the inner sleeve and the inner diameter of the outer sleeve or the radial thickness of the elastomeric sleeve and has a diameter less than the difference between the outer diameter of the outer sleeve and the inner diameter of the inner sleeve or the radial thickness of the drive coupling. These construction dimensions space the ball from contact with shaft 10 so that the ball does not mechanically contact both pulley 12 and shaft 10 thereby keeping these two components normally isolated by the elastomeric sleeve. These dimensions also permit the ball to provide a rigid driving connection between the inner and outer sleeves when elastomeric sleeve 20 is overloaded.

As shown by FIG. 2, the distance between corresponding points of diagonally opposed contact surfaces 28 and 30 or 32 and 34 at the periphery of holes 22a and 22b is greater than the diameter of ball 24 when the elastomeric sleeve is not overloaded. However, under an overload in one direction the elastomeric sleeve yields a sufficient amount so that the diagonal distance between 28 and 30 is sufficiently reduced to allow the ball to drivingly contact these surfaces. In an overload condition in an opposite direction the contact surface 32 and 34 will make the driving contact.

As the ball moves from the FIG. 2 position to a driving position such as in FIG. 3 its engagement with edges 28 and 30 is effectively cushioned by the yieldable material whose rate of change of deflection decreases with increasing torque as the ball approaches driving contact to reduce shock of metal-to-metal ball engagement. This is illustrated best by the hysteresis loop of FIG. 4 illustrating the vibration damping characteristics of the invention. At 600 lbs. ft. clockwise torque for example, on loading curve c of the loop, the deflection of the elastomeric sleeve rapidly decreases to cushion the subsequent engagement of the ball and the contact surfaces. The gradual change in slope of the curve near the stop points is in part, due to the compression of the elastomeric sleeve by the ball. This increased compression of the elastomeric sleeve by the ball during relative movement of the metal sleeves from the FIG. 2 position to the FIG. 3 position is believed to be due to the fact that the perpendicular distance or diameter of the hole in the elastomeric sleeve in the transverse plane illustrated in FIGS. 2 and 3 and though the center of the ball decreases, this diameter is largest in the normal unstressed position shown in FIG. 2 and decreases on increased relative movement to the limit position shown in FIG. 3. Thus, with increasing torque loading, the deflection first increases relatively rapidly, and then gradually without shock smoothly changes to a very slow rate of increase of deflection with increasing torque loading as the stress in the elastomer changes from compression and shear to tension so the rate of change of reflection changes gradually and coupling will sustain a higher torque load without metal-to-metal contact than the elastomeric sleeve alone and this will cushion the engagement of metal-to-metal contact. Curve d illustrates the lag in the recovery of the elastomeric sleeve on removal of the previously applied load. In the lower part of the loop, curve e represents a counterclockwise loading of the same type, point t represents the engagement of the ball and the contact surfaces, and curve f represents the unloading of the sleeve.

The metal sleeves are slightly softer than the ball so that in initial use, a seat is automatically formed on the ball contacting surface of each of the holes in the sleeves. In the illustrated embodiment of the invention there are three balls in corresponding holes equally spaced in the assembly as shown in FIG. 2. It will be understood, however, that any suitable number of ball stops may be utilized as desired. In the assembly the balls are trapped in their associated holes by the pulley and the shaft.

The elastomeric sleeve 20 will operate by torsionally flexing in response to occasional engine-excited torsional vibrations to damp vibrations and smooth the flow of power between the sleeve 10 and pulley 12 and by flexing to compensate for overrun of the belt driven accessory such as the fan. In the event that there are overloads from engine-excited torsional vibrations or other causes, the inner and outer sleeves will rotate relative to one another causing the elastomeric sleeve to flex and damp the vibrations. To prevent relative rotation or slippage between the elastomeric sleeve and the inner and outer steel annuli, the ball members will jam and make alternate metal-to-metal driving contact at curved contacts 28 and 30 or 32 and 34 depending on the direction of the overload. FIG. 3 shows surfaces 28 and 30 making the contact when the pulley load is excessive. This relative limited angular travel of the inner and outer sleeve to a stop is precisely controlled thereby preventing the imposition of high shear stresses on the elastomeric sleeve and prevents the exceeding of the elastic limit thereof. In a similar manner, the diagonally opposed curved contact surfaces 32 and 34 will be effective to limit the deflection of the elastomeric sleeve or the relative slippage between the elastomeric sleeve and the inner and outer annuli when the overload is in an opposite direction.

With this improved ball and radial hole construction, angular travel of the inner and outer sleeves relative to each other is precisely stopped thereby adding to the effectiveness and efficiency and service life of a flexible coupling. The construction can be readily fabricated since only drilled radial openings and balls are employed and no special camming surfaces are needed.

It will be understood that this invention may be utilized in many other environments for similar purposes. It may be used for example, in transmission controls, between the transmission control lever or actuator and the transmission. In such an environment the elastomeric sleeve, having high internal friction, will dampen vibration and suppress rattle which would otherwise be transmitted to the passenger compartment of a vehicle. A stabilized metal-to-metal drive between the lever and the transmission would take place on gear change. The invention may also be effectively utilized in transmitting linear forces.

It will be appreciated that other modifications may be made to this invention in view of the teachings illustrated and described.

I claim:

1. A method of making a mechanical power transmitting connection comprising drivingly joining rigid drive and driven members with an elastomeric vibration damping member therebetween, drilling a continuous opening through all of said members with a single size tool to form a hole in said elastomeric vibration damping member smaller than the holes in said drive and driven members, inserting a rigid unit having a width between the diameters of said smaller and larger holes into said opening and in said vibration damping member to locate said unit in alignment with and spaced from the edges defining the holes in said drive and driven members to thereby allow said unit to make a rigid drive connection between said drive and driven members subsequent to a predetermined deflection of said vibration damping member by said drive and driven members.

2. The method of making a mechanical power transmitting connection as defined in claim 1, and further including the step of closing said continuous opening by mounting said drive member on a rotatable drive shaft and mounting a rotatable output member on said driven member.

3. A method of making a drive transmitting connection comprising the steps of positioning torque-imparting and torque receiving members adjacent to each other and drivingly connecting said members with an elastomeric member of predetermined thickness to damp vibrations while transmitting torque between said first mentioned members, forming a hole in each one of said members so that the holes align and co-operate to form an opening, inserting a ball member into said opening which ball member has a diameter greater than the thickness of said elastomeric member and less than the depth of said opening, retaining said ball in said opening only by the elastomeric member so that said ball will directly contact and drivingly connect said torque-imparting and torque-receiving members only subsequent to predetermined deflection of said elastomeric member in response to a predetermined drive torque applied thereto by said torque imparting member.

4. A method of making a torque-transmitting connection which dampens vibrations and smooths out the flow of power through said connection comprising the steps of providing inner and outer cylindrical metallic torque-transmitting sleeves, drivingly connecting said sleeves by an elastomeric sleeve, drilling a radial opening through all of said metallic sleeves and said elastomeric sleeve, providing a metallic ball having a diameter less than the diameter of said drilled openings in said metallic sleeves and greater than the thickness of said elastomeric sleeve and less than the depth of said drilled opening, inserting said ball into said opening so that said ball is retained only by said elastomeric sleeve and is spaced from the walls defining the drilled openings in said metallic sleeves and so that said ball will make contact with diametrically opposed portions of said openings in said metallic sleeves to drivingly couple said metallic sleeves only subsequent to a predetermined overload of said elastomeric sleeve by either of said metallic sleeves.

References Cited

UNITED STATES PATENTS 3,177,559  4/1965  Boschi et al. ____ 29—148.4 A X

THOMAS H. EAGER, Primary Examiner

U.S. Cl. X.R.

29—436, 442; 64—28